(12) United States Patent
Davies et al.

(10) Patent No.: US 9,080,033 B2
(45) Date of Patent: Jul. 14, 2015

(54) BIOBASED PLASTICIZER AND SURFACE COVERING EMPLOYING SAME

(71) Applicant: AWI Licensing Company, Wilmington, DE (US)

(72) Inventors: Mary Kate Davies, Stevens, PA (US); Dong Tian, Lancaster, PA (US)

(73) Assignee: AWI Licensing Company, Wilmington, DE (US)

( * ) Notice: Subject to any disclaimer, the term of this patent is extended or adjusted under 35 U.S.C. 154(b) by 0 days.

(21) Appl. No.: 14/107,981

(22) Filed: Dec. 16, 2013

(65) Prior Publication Data

US 2014/0102335 A1  Apr. 17, 2014

Related U.S. Application Data

(63) Continuation of application No. 13/423,358, filed on Mar. 19, 2012, now Pat. No. 8,609,884.

(51) Int. Cl.
*C07D 307/02* (2006.01)
*C08K 5/1535* (2006.01)
*C08K 5/10* (2006.01)
*C08L 27/06* (2006.01)

(52) U.S. Cl.
CPC ............. *C08K 5/1535* (2013.01); *C08K 5/10* (2013.01); *C08L 27/06* (2013.01)

(58) Field of Classification Search
None
See application file for complete search history.

(56) References Cited

U.S. PATENT DOCUMENTS

| 3,738,973 A | 6/1973 | Kallenbach et al. |
| 2011/0071238 A1 | 3/2011 | Bastioli et al. |
| 2013/0022771 A1 | 1/2013 | Malet et al. |
| 2014/0018268 A1* | 1/2014 | Mosier et al. ............ 508/267 |

FOREIGN PATENT DOCUMENTS

| CN | 102757552 | 10/2012 |
| WO | 2009/135921 | 11/2009 |

OTHER PUBLICATIONS

Database CAplus Chemical Abstracts Service, Columbus, Ohio, US; Database Accession No. 1998:43714, Abstract of Yao et al., Jingxi Huagong (1997), 14(6), 29-32.*
Database CAplus Chemical Abstracts Service, Columbus, Ohio, US; Database Accession No. 2002:191667, Abstract of Gandini, Abstracts of Papers, 223rd ACS National Meeting, Orlando, FL, United States, Apr. 7-11, 2002 (2002), PMSE-083 Publisher: American Chemical Society, Washington, D. C.*
Hussain et al., Progress in Organic Coatings 45 (2002) 435-439.*
Juben et al., Green Chem., 2007, 9, 342-350.*
Database CAplus Chemical Abstracts Service, Columbus, Ohio, US; Database Accession No. 1959:65476, Abstract of Yamashita et al., Kogakuin Daigaku Kenkyu Hokoku (1955), 2, 44-50.*
Sanderson et al: "Synthesis of Difuran Diesters from Furfural, and their Evaluation as Plasticizers for Polyvinyl Chloride," Journal of Applied Polymer Science, (John Wiley & Sons, Inc.) vol. 55, No. 13, Mar. 28, 1995, pp. 1837-1846, XP000516797 . US.
XP002696204. Nov. 16, 1984 (Database accession No. 39251-88-2) Abstract.

* cited by examiner

*Primary Examiner* — Karl J Puttlitz
(74) *Attorney, Agent, or Firm* — Michael U. Lee

(57) ABSTRACT

Described herein are biobased plasticizer compositions comprising a compound having the structure of Formula I:

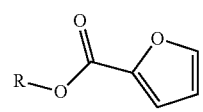

wherein R is $C_6$-$C_{18}$ alkyl; along with methods of making and using same.

9 Claims, No Drawings

BIOBASED PLASTICIZER AND SURFACE COVERING EMPLOYING SAME

CROSS-REFERENCE TO RELATED PATENT APPLICATIONS

The present application is a continuation of U.S. patent application Ser. No. 13/423,358, filed Mar. 19, 2012, the entirety of which is hereby incorporated by reference.

FIELD

The present invention relates to plasticizers and surface coverings. More particularly, the present invention relates to biobased plasticizers and surface coverings plasticized with biobased plasticizers.

BACKGROUND

Many plastic materials, including polyvinylchloride (PVC), have a wide variety of uses, including as surface coverings. For many applications, plastic materials can be made softer and more flexible through the use of plasticizers. In particular, phthalates have long been used as plasticizers in PVC and other plastics.

Phthalates, such as di-(-2-ethylhexyl)phthalate and butyl benzyl phthalate have come under increased scrutiny for a variety of reasons, including their reliance on petroleum-based feedstocks for production.

Some plasticizers based on non-petroleum feed stocks are known, including those based on vegetable oils, including soy, castor oil, and acetyl tributyl citrate. Other non-petroleum plasticizers include those derived from natural sugars, such as sorbitol and mannitol and those that are based on diesters of linear aliphatic hydrocarbons.

Generally, availability of non-phthalate and non-petroleum based plasticizers would permit expanded and/or new utilities and performance in known and new applications.

It would be desirable to increase the available types of non-petroleum plasticizers and particularly to develop new non-petroleum based plasticizers, including some that are useful in floor tiles and other surface coverings.

A biobased plasticizer and a surface covering plasticized by a biobased plasticizer that do not suffer from one or more of the above drawbacks would be desirable in the art.

SUMMARY

According to an embodiment, a biobased plasticizer includes an ester formed as a reaction product of a furan derivative selected from the group consisting of furoic acid, furfural and furfuryl alcohol reacted with a carboxylic acid or an alcohol.

According to another embodiment, a biobased plasticizer includes an ester formed as a reaction product of a biobased aromatic compound and a biobased aliphatic compound, the biobased aromatic compound and the biobased aliphatic compound each being derived from a renewable resource.

According to another embodiment, a surface covering is plasticized with a composition comprising an ester formed as a reaction product of a functionalized aromatic heterocyclic compound reacted with a carboxylic acid or an alcohol.

Other features and advantages of the present invention will be apparent from the following more detailed description of exemplary embodiments, which illustrate, by way of example, the principles of the invention.

DETAILED DESCRIPTION

In accordance with exemplary embodiments, biobased plasticizers and surface coverings plasticized by biobased plasticizers are disclosed. Embodiments of the biobased plasticizers and/or surface coverings permit use of a non-petroleum based plasticizer in surface coverings and other applications, permit. plasticizers and/or surface coverings to be manufactured partially or entirely from renewable resources, permit plasticizers to be used in place of phthalates and/or and other plasticizers under increased scrutiny by consumers, permit acceptable performance of plasticizers, or combinations thereof.

As used herein, the term "biobased" refers to being having at least one material derived from a non-petroleum source. Organic non-petroleum sources include, but are not limited to, plant oils extracted from plant seeds, such as castor oil, linseed oil, soy oil, tall oil (pine oil), tung oil, vernonia oil, lesquerella oil (bladderpod oil), cashew shell oil, or other plant oils rich in unsaturated fatty acids, corn, corn sugar, sugar cane, vegetable oil, oats, cellulose, starch, sugar, sugar alcohols, such as xylitol, sorbitol, maltitol, sucrose, glycol, glycerol, erythritol, arabitol, rebitol, mannitol, isomalt lattitol, fructose, or polysaccharides or monosaccharides originated from cellulose, starches, sugars, or combinations thereof. Inorganic non-petroleum sources include, but are not limited to, ground shells from animals, such as sea shells, clams, coral, or combinations thereof. A composition or product is identifiable as being biobased by having a carbon signature, such as a radioactive C14 or C13 signature, indicating that all or a portion of the carbon is from a non-petroleum source (for example, greater than about 5%, greater than about 25%, greater than about 50%, greater than about 90%, at about 100%, or any suitable combination, subcombination, range, or subrange therein), whether organic, inorganic, or both, in contrast to a signature indicating the presence of carbon from a petroleum source, such as oil or coal. In some embodiments including material from such non-petroleum sources, one or more of the above non-petroleum sources are excluded from forming the biobased product of component. In sonic embodiments, biobased components are also recycled, for example, having material recovered as post-consumer or post-industrial waste utilized in the production of new products, such as, wood or plants, pecan shells, wood flour, saw dust, walnut shells, rice hulls, corn cob grit, or combinations thereof. In other embodiments, biobased components are recycled by including recycled materials that are not biobased, such as, limestone, quartz, ceramic powders, glass, fly ash, concrete powder, sand, and combinations thereof, so long as additional biobased components are included.

Biobased plasticizers in accordance with exemplary embodiments comprise an ester formed as a reaction product of a functionalized heterocyclic compound derived from a renewable resource and a carboxylic acid or an alcohol to form an ester. Such compositions are useful for plasticizing surface coverings, including flooring tiles and sheets, as well as other vinyl materials.

In some embodiments, the functionalized heterocyclic compound is a furan derivative, which can be derived from components of naturally occurring materials, thus being a renewable resource and a source of biobased carbon.

Suitable furan derivatives for use with exemplary embodiments include acids such as furoic acid or furandicarboxylic acid. A particularly suitable furoic acid includes 2-furoic acid, while a particularly suitable furandicarboxylic acid includes 2,5-furandicarboxylic acid. Other suitable furandicarboxylic acids include, but are not limited to, 3-furoic acid, 2,3-furandicarboxylic acid, 2, 4-furandicarboxylic acid, 3,4-furandicarboxylic acid, 2,3,5-furantricarboxylic acid, and 2,3,4,5-furantetracarboxylic acid.

In another embodiment, a biobased plasticizer uses a furan derivative in the form of an aldehyde, such as furfural, as the functionalized heterocyclic compound.

In yet another embodiment, the furan derivative compound used in forming a biobased plasticizer is an alcohol, such as furfuryl alcohol.

Plasticizers in accordance with exemplary embodiments are typically esters and formed as the reaction product of the functionalized heterocyclic compound with a carboxylic acid or an alcohol, the selection of which depends upon the nature of the compound being reacted. That is, alcohols are generally reacted with acids to form the ester, while aldehydes and acids may be reacted with alcohols. Any suitable alcohols or carboxylic acids may be used, although those having in the range of about 6 to about 18 carbon atoms in the main chain are typical. In embodiments in which alcohols are reacted with the functionalized heterocyclic compound to form plasticizers in accordance with exemplary embodiments, the alcohols may be polyols and in particular may be diols in sonic cases.

It will further be appreciated that in some embodiments, the alcohol or carboxylic acid to be reacted with the furan derivative or other functionalized heterocyclic compound may itself be a biobased component. As a result, the formed ester for use as a plasticizer may be entirely or nearly entirely biobased. For example, biobased alcohols such as 1,3-propanediol or 1,4-butanediol may be used as the alcohol reactant for use in combination with furan derivates that are acids such as furoic acid and furandicarboxylic acid. Similarly, renewable carboxylic acids, such as sebacic acid, succinic acid, adipic acid, and azelaic acid, may be employed as the acid reactant for use in combination with furan derivatives that are alcohols.

Embodiments in which the functionalized heterocyclic compound is an aldehyde (such as furfural) may be converted to the ester product for use as a plasticizer directly by reacting the aldehyde with an alcohol in the presence of bromine or other catalyst to form the ester. Additionally or alternatively, the aldehyde may be directly esterified using aluminum triethoxylate, with or without a catalyst. Alternatively, a two step process may be employed. In the first step, the furfural can be catalytically converted to 2-furoic acid. Any suitable catalyst may be employed, including potassium permanganate for example. The 2-furoic acid s further reacted with an alcohol in the presence of a catalyst, such as a strong acid, for example, to form the ester. The use of a two step process may be preferred over the use of a one step process in which bromine is the catalyst as a result of the bromine's toxicity.

2-furfuryl alcohol may be converted to an ester in a one step reaction with a suitable acid, such as sebacic acid, adipic acid, and azelaic acid, for example. The reaction may be catalyzed using a strong acid.

In one embodiment, 2-furoic acid is reacted with a bis-diol in the presence of heat and a catalyst to yield an ester having the following structure:

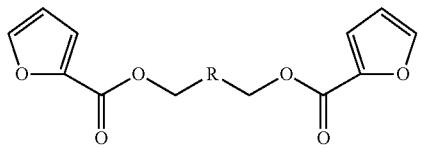

In another embodiment, the bis-diol is replaced by polyols in the reaction. Exemplary polyols include, but are not limited to, aliphatic polyether polyols and aliphatic polyester polyols, either of which can include components derived from renewable resources, such as biobased 1,3-propanediol or 1,4-butanediol, sebacic acid, succinic acid, adipic acid, and azelaic acid.

In another embodiment, 2,5-furandicarboxylic acid is reacted with two organic alcohols (ROH and R'OH) to yield an ester having the following structure, where R and R' may or may not be the same aliphatic carbon change:

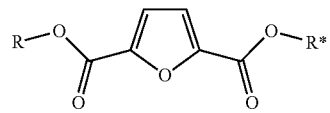

The presence of the functional groups at particular numerical positions of the furan derivatives used as reactants can result in providing plasticizer compounds that are structural analogs to those formed with non-renewable materials currently used in plasticizer formation having, for example, a benzoate or dibenzoate-type structure. For example, two functionalities at the 2,5 position of furandicarboxylic acid can be used to form a terephthalate analog when reacted with an alcohol as described above, as can readily be seen in the following comparison:

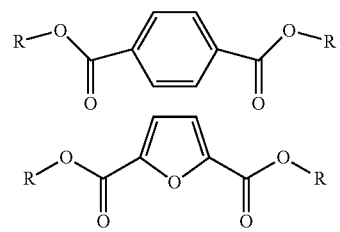

In a like manner, two adjacent functionalities from the furan ring at the 2,3 positions or the 34 positions of furandicarboxylic acid can be used to form an orthophthalate analog when reacted with an alcohol as described above.

Unlike a phthalate, however, furandicarboxylic acid is derived from renewable resources, not from petroleum feedstock. It has the additional advantage of being more polar than phthalates and other similar compounds and as a result may provide better solution as a plasticizer. In addition to increased solvation capability, the heteroatomic aromatic ring of a furan-based material, may exhibit a lower rate of migration from a plasticized article than the comparable phthalate or benzoate. The polarity of the ring provides increased opportunity for intermolecular bonding between the resin and the plasticizer, thus decreasing the chance for migration away from the resin.

Similarly, an ester resulting from the reaction of furoic acid or furfural with an alcohol results in a compound that has a structure analogous to a benzoate, but also provides the benefit of being derived from a renewable resource and thus providing a biobased plasticizer:

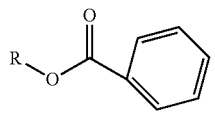

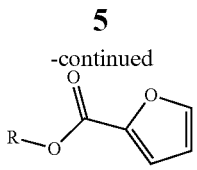

Although described primarily herein in terms of reactions using renewable heterocyclic compounds, other aromatics may be used in place of such compounds, including lignin, porphyrins and amino acids. For example, a porphyrin may be reacted at a double bond with an oxidizing agent, such as $OsO_4$ or dilute $KMnO_4$, resulting, in a diol product, which may then be reacted with a carboxylic acid to produce a diester, which may be used as a plasticizer. Additionally or alternatively, amino acids, which include a carboxylic acid group, may be reacted with an alcohol to form the ester, analogous to a benzoate.

The surface coverings plasticized by the plasticizer may be any suitable surface covering. For example, suitable surface coverings include, but are not limited to vinyl composition tile, luxury vinyl tile, other suitable tile products, cushion vinyl, sheet products, or combinations thereof.

EXAMPLES

The invention is further described by way of the following examples, which are presented by way of illustration, not of limitation.

Example 1

A biobased plasticizer was formed using 2-furoic acid. 120 g of furoic acid (commercially obtained from Pennakem) was reacted with 123.3 g, of isooctyl alcohol in 70 mL of toluene and 1.2 g p-toluenesulfonic acid. The reactants were stirred under heat to dissolve the acid, then heated to boiling during which 2-octyl furanoate ($C_{14}H_{24}O_3$) and water were formed as reaction products. Because of an azeotrope formed by the toluene solvent and the water by-product, the reaction was cooled and dried over magnesium sulfate to remove water, then filtered. The organic components were then distilled under vacuum to separate the furanoate product. A clear liquid was obtained and its identity as 2-octyl furanoate was confirmed by FTIR.

Examples 2-6 and Comparative Example 1

The 2-octyl furanoate of Example 1 was then used as biobased plasticizer to formulate a floor covering composition and formed into tiles. Table 1 provides five formulations used in creating tiles using, the plasticizer of Example 1 and a control formulation using a conventional phthalate plasticizers as a comparative example. In each case, 1 kg batches were formed and the amounts in Table 1 reflect grams of each component.

TABLE 1

|  | Comp. Ex. 1 | Ex. 2 | Ex. 3 | Ex. 4 | Ex. 5 | Ex. 6 |
|---|---|---|---|---|---|---|
| Solvin 550 GA (PVC Resin) | 45.0 | 45.0 | 45.0 | 45.0 | 45.0 | 45.0 |
| Formolon 608 (PVC Resin) | 71.0 | 71.0 | 75.0 | 71.0 | 71.0 | 71.0 |
| Kronos 2210 (titanium dioxide) | 10.0 | 10.0 | 10.0 | 10.0 | 10.0 | 10.0 |
| Thermchek T843 (stabilizer) | 2.3 | 2.3 | 2.3 | 2.3 | 2.3 | 2.3 |
| S-3100 (butyl benzyl phthalate/ epoxidized soy oil) | 32.0 | 0 | 0 | 0 | 0 | 0 |
| 2-octyl furanoate | 0 | 40.0 | 36.0 | 30.0 | 32.0 | 20.0 |
| Di-propylheptyl phthalate | 8.0 | 0 | 0 | 0 | 0 | 0 |
| Dioctyl terephthalate | 0 | 0 | 0 | 10 | 0 | 0 |
| Di-isononyl cyclohexanoate | 0 | 0 | 0 | 0 | 8.0 | 20.0 |
| Limestone | 823.7 | 831.7 | 831.7 | 831.7 | 831.7 | 831.7 |

The resulting compositions were processed into floor tiles and except for a strong odor in nearly every case, generally demonstrate acceptable results with respect to mill feed, roll tack, hot strength, blanket formation, moisture curl, and light stability, as shown in Table 2, and that achieve the additional advantage of utilizing a biobased plasticizer.

TABLE 2

|  | Ex. 2 | Ex. 3 | Ex. 4 | Ex. 5 | Ex. 6 | Comp. Ex. 1 |
|---|---|---|---|---|---|---|
| Mill Feed | Good | Poor | Good | Good | Very Good | Excellent |
| Roll Tack | Very Good | Fair | Good | Fair | Good | Excellent |
| Hot Strength | Very Good | Fair | Fair | Fair | Fair | Excellent |
| Blanket Formation | Excellent | Good | Fair | Fair | Fair | Excellent |
| Moisture Curl Response | Poor | Poor | Fair | Fair | Good | Good |
| Light Stability | Very Good | Excellent | Very Good | Excellent | Good | Fair |

Example 7

A second biobased plasticizer was formed by reacting 286 g 1,3-propanediol, 175 g isophthalic acid, 156 g phthalic anhydride, 151 g sebacic acid, and 24 g 2,5-furandicarboxylic acid in the presence of 0.4 g dibutytin bis-lauryl mercaptide as catalyst (obtained as T-20 from Air Products of Allentown, Pa.).

The foregoing illustrates some of the possibilities for practicing the invention. Many other embodiments are possible within the scope and spirit of the invention. It is, therefore, intended that the foregoing description be regarded as illustrative rather than limiting, and that the scope of the invention is given by the appended claims together with their full range of equivalents.

The invention claimed is:

1. A surface covering comprising:
from about 1.5 wt. % to about 5 wt. % of a biobased plasticizer composition comprising isooctyl 2-furoate; wherein the surface covering is selected from: a tile product and a sheet product.

2. The surface covering of claim 1, wherein the tile product is selected from a vinyl composition tile and a luxury vinyl tile.

3. The surface covering of claim 1, comprising from 3.2 wt. % to 3.6 wt. % of isooctyl 2-furoate.

4. A surface covering comprising:
from about 1.5 wt. % to about 5 wt. % of a biobased plasticizer composition comprising a compound having the structure of Formula I:

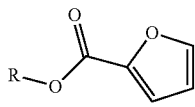

I wherein R is isooctyl;
wherein the surface covering is selected from: a tile product and a sheet product; and
wherein the compound having the structure of Formula I is a reaction product of furoic acid and isooctyl alcohol.

5. The surface covering of claim 4, wherein the isooctyl alcohol is derived from a renewable resource.

6. The surface covering of claim 5, wherein the biobased plasticizer composition further comprises at least one nonrenewable component.

7. A surface covering of claim 6 wherein the tile product is selected from a vinyl composition tile and a luxury vinyl tile.

8. The surface covering of claim 1 comprising from about 2 wt. % ot about 4 wt. % of the biobased plasticizer composition comprising isooctyl 2-furoate.

9. The surface covering of claim 4 comprising from about 2 wt. % ot about 4 wt. % of the biobased plasticizer composition comprising the compound having the structure of Formula I.

* * * * *